May 1, 1956  A. O. ROBERTS  2,743,804
CLUTCH
Filed May 10, 1950  2 Sheets-Sheet 1
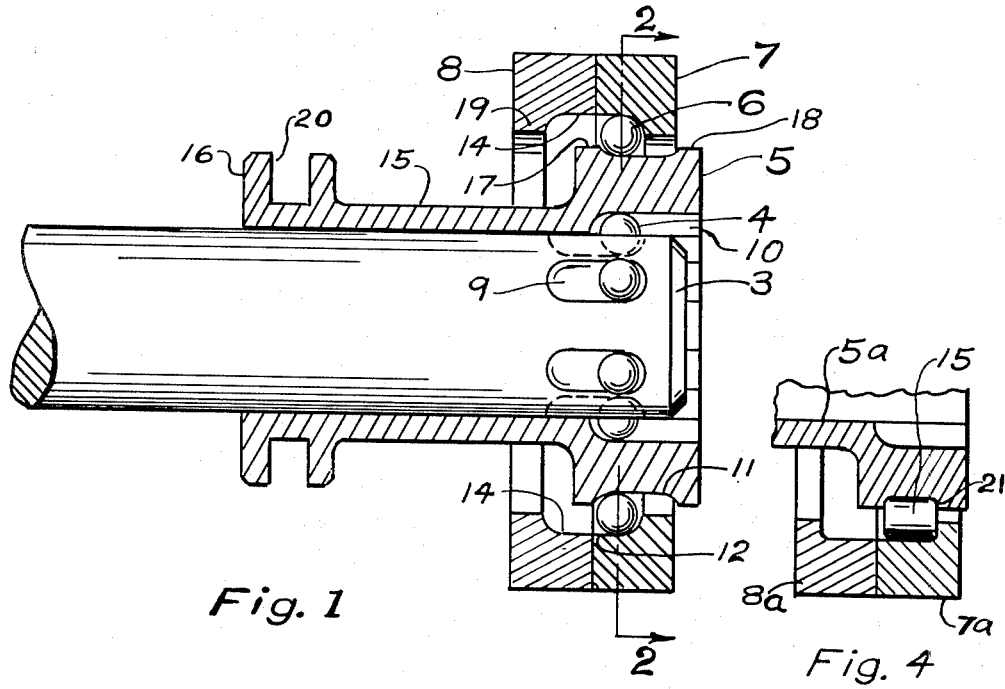
*Fig. 1*
*Fig. 4*
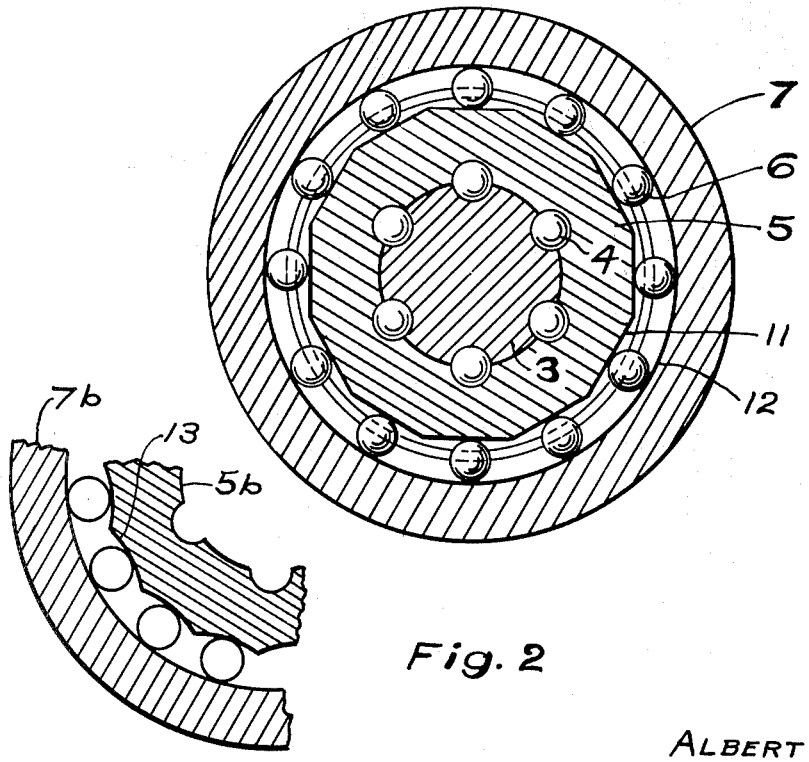
*Fig. 2*
*Fig. 3*
INVENTOR.
ALBERT O. ROBERTS
BY
ATTORNEY May 1, 1956  A. O. ROBERTS  2,743,804
CLUTCH Filed May 10, 1950  2 Sheets-Sheet 2

INVENTOR.
ALBERT O. ROBERTS
BY
*Arthur M. Smith*
ATTORNEY

United States Patent Office 2,743,804
Patented May 1, 1956

2,743,804

CLUTCH

Albert O. Roberts, Dearborn, Mich.

Application May 10, 1950, Serial No. 161,178

2 Claims. (Cl. 192—48)

The present invention relates to a coupling for selectively connecting the various elements of a mechanism which contains a plurality of parts rotatable about a common axis, and more particularly to such a coupling wherein the drive is transmitted through a plurality of balls or rollers. This application is a continuation-in-part of my co-pending application for "Combination Fluid Torque Converter and Transmission," Serial No. 105,616, filed July 19, 1949, now Patent No. 2,673,449.

The conventional method of selectively coupling a driving and a driven member which are rotatable about a common axis and which have concentric portions is by dental or toothed engagement. In such a construction, toothed shifting members are slidable axially along the common axis to selectively engage various gear elements. Several objectionable features are characteristic of this dental construction. The engagement of the teeth is noisy even when a suitable lubricant is provided. Further, when the separate toothed elements are stopped with their respective teeth in line, engagement of the toothed elements is difficult. It has also been found that disengagement of the toothed elements is difficult when the device is under load.

Therefore, it is a primary object of the present invention to provide a coupling which is as positive as a conventional dental coupling and which will easily engage regardless of the angular position of the members being coupled.

It is another object of the present invention to provide a coupling for transferring rotary motion from a driving to a driven member, which may be engaged before the driving member and driven member have a completely synchronized speed without grating and excess noise, and which can easily be disengaged even under full load.

It is another object of the present invention to provide a simple and efficient coupling which will include an effective lock.

It is a further and more specific object of the present invention to provide a coupling adapted to selectively transfer rotary motion from a driving member to driven members which are rotatable about a common axis and which have concentric portions, including a driving shaft having elongated ball seats formed therein and a plurality of balls disposed within said ball seats, a cylindrical shifting member disposed around said driving member and having elongated slots cooperating with the slots in said driving member and a plurality of cam surfaces on the periphery thereof, and a plurality of driven members disposed concentrically around said driving member and having smooth cylindrical inner surfaces adapted for selective engagement with an outer row of balls disposed along the cam surfaces formed on the shifting member.

Other objects of this invention will appear in the following description and appended claims, reference being had to the accompanying drawings forming a part of this specification wherein like reference characters designate corresponding parts in the several views.

In the drawings:

Fig. 1 is a side elevational mid-section view of a coupling embodying the present invention.

Fig. 2 is a sectional elevation taken along the line 2—2 in the direction of the arrows, Fig. 1.

Fig. 3 is a fragmentary section showing a modification of the cam portions of the carrier of the present invention.

Fig. 4 is a fragmentary section showing a modification of the present invention utilizing rollers instead of balls.

Figure 5:
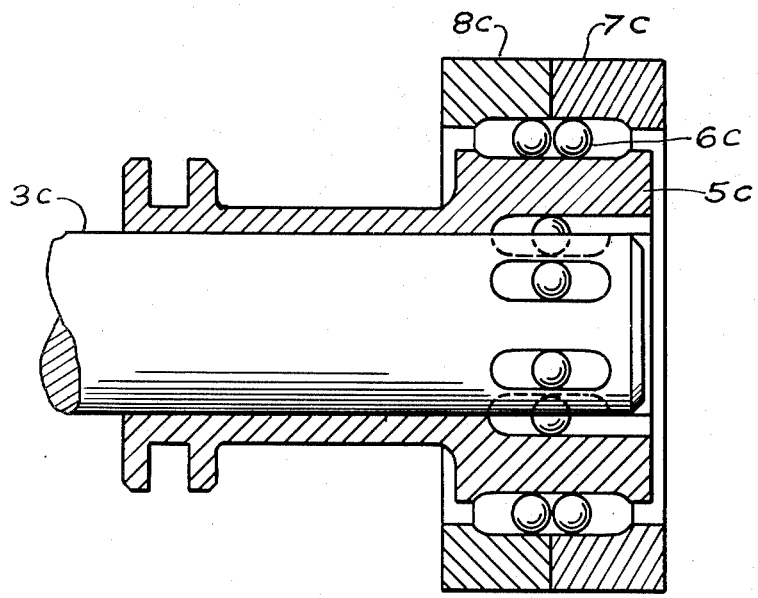
Fig. 5 is a side elevational mid-section view of a coupling embodying a modification of the present invention utilizing a double row of balls.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A preferred embodiment of the present invention is shown in Figs. 1 and 2 of the drawings. A rotatable driving shaft 3 is provided near one end with a plurality of axially extending elongated slots 9. A ball 4 is seated in each of the slots 9. A cylindrical sleeve 15 is disposed around the driving member 3 and has a carrier member 5 formed at one end and a shifting collar 16 formed at the other end. The carrier member 5 is provided with a plurality of spaced axially extending elongated slots 10 on its inner surface, which slots extend over the upper portion of the balls 4. The elongated slots 9 and 10 permit the sleeve 15 to slide axially on the driving member 3. The periphery of the carrier 5 is provided with the flanges 17 and 18 and the flat cam surfaces 11 therebetween. Disposed concentrically around the driving member 3 are the torque transfer members 7 and 8 having smoother cylindrical inner surfaces 12 and 14. The transfer members 7 and 8 are juxtaposed about the axis of the driving member 3 to provide a substantially continuous cylindrical inner face 12—14. A plurality of balls 6 are provided between the smooth cylindrical face 12—14 and the flat cam surfaces 11 of the carrier member 5. One of the transfer members 7 or 8 may be stationary to act as a brake when engaged by the balls 6. Another possibility is that both of the members 7 and 8 may be rotatable and connected to suitable gear trains so as to provide different speeds when engaged. One of the members 7 or 8 may be geared to provide a suitable reverse drive. Any of these constructions may be provided by known methods and it is believed that a discussion of the structure required for these embodiments is not necessary. One use of a ball coupling provided by the present invention as a part of a transmission will be found in my co-pending application on a "Combination Fluid Torque Converter and Transmission," Serial No. 105,616, filed July 19, 1949, now Patent No. 2,673,449. The construction shown particularly in Fig. 1 therein utilizes one embodiment of my present invention.

Referring particularly to Fig. 1 of the drawings herein, rotational force is transferred from the driving member 3 through the balls 4 to the carrier 5 from the side walls of the slots 10. The force is then transferred from the carrier 5 along the cam surfaces 11 through the outer balls 6 to the inner cylindrical surface of the member 7, which member will be considered rotatable for the purposes of the present discussion. During acceleration or deceleration, the balls 6 will be rotated slightly around their respective centers in the direction of rotation of the driving member 3 along the cam surfaces 11 until the balls 6 are wedged between the inner cylindrical surface of the member 7 and the cam surfaces 11. This will effect a smooth positive transfer of rotary motion. The balls 6 may be shifted axially from engagement with the member 7 to engagement with the member 8. If the member 8 is connected with reverse gearing the member 7 will have to be stopped in order to shift the balls 6 from the member 7 to the member 8.

In shifting the sleeve 15 so that the torque will be transferred from the driving member 3 to the member 8, a suitable shifting means such as a yoke (not shown) engages the side walls of the slot 20 in the shifting collar 16 (Fig. 1) and the collar 16, sleeve 15, and carrier 5 are moved to the left. The slots 9 and 10 permit axial movement of the sleeve along the driving member 3 while connected thereto by the balls 4. The balls 6 will be rolled to the left by the axial movement of the cam surfaces 11 and will be transferred out of engagement from the member 7 into engagement with the member 8, the flanges 18 and 19 retaining the balls 6 in place. Because the the balls 4 roll from one cylindrical member to another, there is no alignment of coupling teeth to be concerned about and the shift is accomplished smoothly and readily even when the coupling is under load, since the balls operate under rolling friction and there are no loaded sliding surfaces. Shifting from engagement with the member 8 to engagement with the member 7 is accomplished by exactly the reverse operation.

Fig. 3 of the drawings illustrates a modification wherein the cam surfaces 13 are concave instead of flat. This construction will permit the balls to be spaced closer together and will accommodate a larger number of balls, thus increasing the torque capacity.

Fig. 4 of the drawings discloses a modification of the present invention wherein rollers 15 are utilized in place of the balls 6. Operation of the construction of this modification is much the same as with the embodiment shown in Figs. 1 and 2 of the drawings. However, for obvious reasons, the rollers 15 are closely disposed in the seats 21 in the carrier 5.

Fig. 5 of the drawings discloses an embodiment of the present invention wherein a double row of balls 6c are utilized instead of the single balls 6 shown in Figs. 1 and 2 of the drawings. In this construction, one row of balls 6c may be positioned against the inner face of each of the members 7c and 8c so as to lock all three members 3c, 7c, and 8c together. In the alternative, both rows of balls 6c may be positioned against the inner surface of either of the members 7c or 8c. Thus, the member 3c may be coupled with either of the members 7c or 8c exclusive of the other of said members, or all three members 3c, 7c and 8c may be coupled together.

The outer balls in all embodiments of the present invention are assembled with a pre-load so that the movement of the balls is always a rolling movement. The balls are never free to slide out of position and can move axially only by rolling as dictated by the axial movement of the carrier member.

From the foregoing description it will be seen that I have provided a simple and efficient solution to a present problem which affords many important advantages.

Having thus described my invention, I claim:

1. A coupling adapted to selectively transfer torque from a driving member to one of a number of driven members through concentric portions thereof, said driving member and driven members being rotatable about a common axis, comprising a driving shaft, a cylindrical sleeve disposed over said driving shaft and coupled therewith to permit selective movement of said cylindrical sleeve axially along said driving shaft, an outwardly extending cylindrical carrier member formed on said sleeve and having flattened unobstructed cam portions which provide a symmetric polygonal cam surface on the periphery of said carrier, a lug extending outwardly adjacent each side of said cam surface, a plurality of hollow cylindrical driven members having their inner surfaces of the same diameter and rotatable about the axis of the driving member, said driven members being juxtaposed so that their inner surfaces provide a substantially continuous inner cylindrical face, a plurality of identical outer spherical balls disposed one on each flattened cam portion between said lugs and preloaded between the cam portion and the inner surface of one of said driven members for limited rotary and axial rolling movement relative to said carrier member about the axis thereof, and shifting means communicating with said sleeve and adapted to shift said sleeve axially along said driving shaft to selectively couple one of said driven members with said driving shaft through said outer balls.

2. A coupling adapted to selectively transfer torque from a driving member to one of a number of driven members through concentric portions thereof, said driving member and driven members being rotatable about a common axis, comprising a driving shaft having spaced elongated slots extending axially thereof, an inner spherical ball disposed within each of said slots, a cylindrical sleeve disposed over said driving shaft and having spaced slots on the inner surface thereof which mate with the slots in said driving shaft and cover the outer portions of said inner balls, an outwardly extending cylindrical carrier member formed on said sleeve and having flattened unobstructed cam portions which provide a symmetric polygonal cam surface on the periphery of said carrier, a lug extending outwardly adjacent each side of said cam surface, a plurality of hollow cylindrical driven members having their inner surfaces of the same diameter and rotatable about the axis of the driving member, said driven members being juxtaposed so that their inner surfaces provide a substantially continuous inner cylindrical face, a plurality of identical outer spherical balls disposed one on each flattened cam portion between said lugs and preloaded between the cam portion and the inner surface of one of said driven members for limited rotary and axial rolling movement relative to said carrier member about the axis thereof, and shifting means communicating with said sleeve and adapted to shift said sleeve axially along said driving shaft to selectively couple one of said driven members with said driving shaft through said outer balls.

References Cited in the file of this patent

UNITED STATES PATENTS

| 901,408 | Wirtz | Oct. 20, 1908 |
| 1,380,917 | McCarrell | June 7, 1921 |
| 1,584,104 | Lentaty | May 11, 1926 |
| 1,881,728 | Levadahl | Oct. 11, 1932 |
| 1,942,669 | Smith | Jan. 9, 1934 |
| 2,106,049 | Colucci | Jan. 18, 1938 |

FOREIGN PATENTS

| 346,649 | Italy | Feb. 27, 1937 |